United States Patent
Jones et al.

(10) Patent No.: US 8,431,651 B2
(45) Date of Patent: Apr. 30, 2013

(54) VACUUM THERMOFORMED, EXTRUDED SHEETING WITH IMPROVED REDUCED GLOSS

(75) Inventors: Mary Ann Jones, Midland, MI (US); Cheryl L. Weckle, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 13/379,452

(22) PCT Filed: Jul. 2, 2010

(86) PCT No.: PCT/US2010/040859
§ 371 (c)(1),
(2), (4) Date: Dec. 20, 2011

(87) PCT Pub. No.: WO2011/008582
PCT Pub. Date: Jan. 20, 2011

(65) Prior Publication Data
US 2012/0101232 A1 Apr. 26, 2012

Related U.S. Application Data

(60) Provisional application No. 61/225,284, filed on Jul. 14, 2009.

(51) Int. Cl.
C08F 8/00 (2006.01)
C08L 33/04 (2006.01)
C08L 33/10 (2006.01)

(52) U.S. Cl.
USPC .......................................... 525/191; 525/240

(58) Field of Classification Search .................. 525/191, 525/240
See application file for complete search history.

(56) References Cited

U.S. PATENT DOCUMENTS

| | | |
|---|---|---|
| 4,177,160 A | 12/1979 | Cecchin et al. |
| 5,272,236 A | 12/1993 | Lai et al. |
| 5,514,761 A | 5/1996 | Etherton et al. |
| 5,948,867 A | 9/1999 | Abhau |
| 6,184,290 B1 | 2/2001 | Ahmed et al. |
| 6,184,291 B1 | 2/2001 | Ahmed et al. |
| 6,218,470 B1 | 4/2001 | Betso et al. |
| 6,369,161 B1 | 4/2002 | Betso et al. |
| 6,372,847 B1 | 4/2002 | Wouters |
| 6,403,710 B1 | 6/2002 | Ahmed et al. |
| 6,407,172 B1 | 6/2002 | Hausmann |
| 6,472,473 B1 | 10/2002 | Ansems et al. |
| 6,500,900 B1 | 12/2002 | Itoh |
| 6,552,129 B2 | 4/2003 | Babb et al. |
| 6,680,361 B1 | 1/2004 | Cady et al. |
| 6,750,307 B2 | 6/2004 | Weng et al. |
| 6,825,277 B2 * | 11/2004 | van Issum et al. ............ 525/191 |
| 6,841,620 B2 | 1/2005 | Ansems et al. |
| 2003/0197302 A1 | 10/2003 | Kakarala et al. |
| 2005/0176892 A1 | 8/2005 | Weaver et al. |
| 2007/0167575 A1 | 7/2007 | Weaver et al. |
| 2008/0193684 A1 | 8/2008 | Buhring et al. |

FOREIGN PATENT DOCUMENTS

| | | |
|---|---|---|
| WO | 0026268 | 5/2000 |
| WO | 0158970 | 8/2001 |

* cited by examiner

*Primary Examiner* — Nathan M Nutter
(74) *Attorney, Agent, or Firm* — M. Robert Christy

(57) ABSTRACT

The present invention is directed to an elastomer composition having at least two phases, one phase comprising a very low density polyethylene "VLDPE" component and another phase comprising a propylene polymer component wherein the propylene polymer component comprises at least one branched polypropylene and the VLDPE phase is continuous. Preferably, the VLDPE component has a melt tan delta between about 0.7 and 8 as measured by parallel plate rheometer at 0.1 radians per second, 180° C., and 10 percent strain; and the ratio of the melt tan delta of the VLDPE to the melt tan delta of the propylene component is from 0.5 to 4. The invention also provides a method of making such compositions, and to low gloss articles prepared from the same. The inventive compositions are particularly suitable for fabricating thermoformed sheeting with reduced gloss, most preferably employed as a skin in a composite interior automotive article comprising a shaped article and a negative thermoformed shaped skin or as non-carpet automotive flooring.

8 Claims, No Drawings

VACUUM THERMOFORMED, EXTRUDED SHEETING WITH IMPROVED REDUCED GLOSS

CROSS REFERENCE STATEMENT

This application claims the benefit of U.S. Provisional Application No. 61/225,284, filed Jul. 14, 2009, the entire content of which is incorporated herein by reference.

FIELD OF THE INVENTION

The invention relates to compositions suitable for thermoformed extruded sheeting formed from a composition comprising an elastomer component, which comprises a very low density polyethylene, and a propylene polymer component. The inventive compositions demonstrate improved reduced gloss in combination with improved heat resistance in the thermoformed sheeting and other articles prepared from these compositions such as skins for interior automotive articles and automotive flooring.

BACKGROUND

Flexible sheeting that is thermoformed is prominently used in applications where consumers are looking for comfort, luxury look and feel, or convenience. Applications are typically centralized in automotive door panel skins, instrument panel skins, and flooring where low-gloss is desired. For many years, flexible PVC was the dominant material used in thin gauge thermoforming, but with the change in automotive interior design came the need for alternate materials that could satisfy low temperature impact performance in seamless airbag design and also have improved fogging resistance or reduced volatile organic components (VOCs). Flexible thermoplastic polyolefins (TPOs) address some of the short comings of flexible PVC because they don't use plasticizers that cause fogging issues, yet they still exhibit a broad temperature performance window (−40° C. to 120° C.).

However, a majority, if not all, of current flexible TPO sheeting that is used in sun-light exposed parts currently has urethane coatings applied to them to reduce the gloss, and to minimize low molecular weight or degradation components exudation to the surface which are known to increase tackiness and gloss over the vehicle life-time. High gloss is often equated to "cheap/plastic look and feel" whereas low gloss is an attribute that is commonly equated to luxury look and feel, approaching that of leather, and often brings a high value in use proposition. Additionally, glare off of high gloss surfaces may create unsafe driving conditions. Over the last decade, flexible TPOs have not demonstrated the ability to deliver low gloss after thermoforming or a dry feel after weathering—which is one of the main reasons that coatings are used. Coatings add significant costs to TPO sheeting and not all sheet producers have assets in place to use coatings.

TPO compositions for use in low gloss sheet that can maintain low gloss through extended weathering exposure have been developed. TPO blends of one or more ethylene/α-olefin elastomers and one or more polypropylenes to make fabricated articles or products, e.g., instrument panels and door panels, are known. See, for example, U.S. Pat. No. 6,372,847, US Publication No, 2007/0167575 and International Publication No. WO 00/26268. These blends and products demonstrate many desirable qualities, e.g., good to superior melt strength and processability, moldability, impact and mar resistance, modulus, elasticity, and the like. However, in some applications, the fabricated articles or products still exhibit too much gloss.

Various other methods exist for controlling gloss. One method incorporates a filler, e.g., talc, mica, etc., into the blend before thermoforming (typically, the more filler of uneven surface, the less gloss exhibited in a finished product). Other methods include the following: (1) control of the surface of the mold (the smoother the mold surface, the higher the gloss), (2) incorporation of pigment into the blend (different pigments absorb different light frequencies) and (3) elastomer selection (e.g., ethylene/α-olefin copolymer, EPDM, etc.) and blend ratios of "elastomer to crystalline or matrix polymer (e.g., polypropylene)."

While these various methods of controlling gloss are all effective to one degree or another, none are without problems or disadvantages. The use of fillers and/or pigments requires at least one additional blending step and increases the specific gravity of the blend. The addition of fillers and/or pigments may also require the use of other processing aids to facilitate dispersion, throughput and the like. This, in turn, increases the cost of the blend, both in terms of materials and processing costs. Treatment of the mold surface can be problematic, both in terms of effectiveness and cost, especially if the mold is used to prepare products of different gloss values (thus necessitating a separate mold for each gloss requirement). Varying the type and amount of elastomer in the blend is usually preferable to the use of fillers and pigments, but can have a material impact on certain properties of the final product, e.g., modulus, impact resistance, heat resistance, and other mechanical properties.

Thus, there is a need for polymer compositions in which the levels of the polymeric components can be varied to reduce gloss levels in the final products, without impairing rheological, thermal, and/or mechanical properties of the compositions or the final products.

SUMMARY OF THE INVENTION

The present invention is such a composition. Said composition is a multi phase elastomer composition comprising a very low density ethylene polymer "VLDPE" component and a propylene polymer component, said composition having at least two phases, a VLDPE phase and a propylene polymer phase wherein a) the VLDPE component has a density equal to or less than 0.89 g/cc and is present in an amount of from 65 to 80 parts by weight and b) the propylene polymer component comprises at least one branched polypropylene and is present in an amount of from 20 to 35 parts by weight wherein the VLDPE phase is continuous, the melt tan delta ratio between the VLDPE component and the propylene polymer component is from 0.5 to 4 as measured by parallel plate rheometer at 0.1 radians per second, 180° C., and 10 percent strain, and parts by weight are based on the total combined weight of the VLDPE and propylene polymer components.

In another embodiment, the present invention is the above disclosed elastomer composition wherein the at least one branched polypropylene is a copolymer of propylene and an α-olefin, selected form ethylene, 1-butene, 1-pentene, 1-hexene, 1-heptene, or 1-octene, preferably the propylene polymer component is a mixture of branched polypropylene and unbranched polypropylene, and more preferably, the branched polypropylene is present in at least 50 weight percent based on the weight of the propylene polymer component.

In another embodiment, the present invention is process to make an automotive composite article, and articles made therefrom, comprising a shaped article and a shaped skin comprising the above disclosed elastomer composition comprising the steps of:
  i forming a sheet comprising the elastomer composition;
  ii shaping the sheet into a shaped skin; and
  iii applying the shaped skin onto the shaped article producing an automotive composite article,
wherein the automotive composite article is preferably an instrument panel, an interior trim, a door panel, a console, an arm rest, a glove box door, a headliner, an air bag cover, a steering wheel cover, a recreational vehicle part, a golf cart part, a utility cart part, and a water craft part.

In another embodiment, the present invention is process to make automotive non-carpet flooring, and non-carpet automotive flooring made therefrom, comprising the elastomer composition of claim 1 comprising the steps of:
  i forming a sheet comprising the elastomer composition;
  ii shaping the sheet into automotive flooring; and
  iii applying the shaped automotive flooring to an interior vehicle floor.

In another embodiment, the present invention is an article comprising the above disclosed elastomer composition.

DETAILED DESCRIPTION OF THE INVENTION

Component (a) in the elastomeric polymer composition of the present invention is an elastomer. A suitable elastomer for use in the composition of the present invention is a very low density polyethylene. The term "very low density polyethylene", or "VLDPE" is used herein to describe linear ethylene/α-olefin copolymer having densities of generally between about 0.86 and 0.915 grams/cubic centimeter (g/cc), more preferably between about 0.883 to 0.911 g/cc, more preferably less than 0.89 g/cc. "Ultra low density polyethylene" or ULDPE is also included in this term.

The VLDPE ethylene/α-olefin polymers used in the present invention can be prepared in conventional gas phase polymerization processes using Ziegler-type catalysts such as, for example, zirconium, titanium, and vanadium catalyst systems. The VLDPE polymers used in the present invention are not to be confused with the well known substantially linear ethylene polymers and/or linear ethylene polymers (S/LEP) which are polymerized using metallocene catalyst systems. The VLDPE useful for admixing with propylene polymers to prepare the thermoplastic elastomeric composition of the present invention are ethylene polymers which do not have homogeneous chain branching, but do have heterogeneous chain branching. Homogeneous branched ethylene/α-olefin polymers (S/LEP) and their difference from heterogeneous ethylene/α-olefin polymers (VLDPE) are well know and described in U.S. Pat. Nos. 6,184,290; 6,184,291; 6,218,470; 6,369,161; and 6,403,710, which are incorporated herein in their entirety.

Suitable VLDPE elastomers are copolymers of ethylene and α-olefin. Preferred VLDPE used herein, are high molecular weight polymers, generally rigid at room temperatures, but easily formable when heated. The α-olefin contained in the copolymer is selected from the group of propylene, 1-butene, 1-hexene, 1-octene and higher 1-olefins and is present at a concentration of at least 5 percent by weight, preferably 10 percent or more by weight. and more preferably 20 percent or more by weight.

The ethylene/α-olefin copolymers have a preferred melt flow rate (MFR), sometimes referred to as melt index (MI), determined in accordance with ASTM D 1238 (Conditions: 190° C. under a load of 2.16 kilograms, (190° C./2.16 kg)), of about 0.05 to 5.0 gram per 10 minutes (g/10 min). Preferably the MFR of the VLDPE used in the compositions of the present invention is equal to or greater than about 0.05 g/10 min, more preferably equal to or greater than about 0.12 g/10 min, and more preferably equal to or greater than about 0.15 g/10 min. Preferably the MFR of the VLDPE used in the compositions of the present invention is equal to or less than about 5 g/10 min, more preferably equal to or less than about 2 g/10 min, more preferably equal to or less than about 1 g/10 min, and more preferably equal to or less than about 0.5 g/10 min.

The VLDPE used in the elastomer composition of the present invention has a density equal to or less than 0.915 g/cc, preferably equal to or less than 0.911 g/cc, and more preferably equal to or less than 0.89 g/cc. The VLDPE used in the elastomer composition of the present invention has a density equal to or greater than 0.86 g/cc, more preferably equal to or greater than 0.883 g/cc and even more preferably equal to or greater than 0.886 g/cc.

Preferred VLDPE resins are characterized by high molecular weight (i.e. relatively low melt index), broad molecular weight distribution (i.e. relatively high flow rate ratio), and relatively low crystallinity. They are further characterized as having glass transition temperatures between about −52° C. to −39° C., Shore A Hardness of from about 77 to 95, a peak melting point range of from between 114° C. to 119° C., and a flexural modulus of from about 30 to 1500 MPa.

VLDPE suitable for the present invention have a melt tan delta equal to or greater than 0.7, preferably equal to or greater than 0.8 and more preferably equal to or greater than 0.9, as measured by parallel plate rheometer at 0.1 radians per second (rad/sec), 180° C., and 10 percent strain. VLDPE suitable for the present invention have a melt tan delta equal to or less than 8, preferably equal to or less than 5, more preferably equal to or less than 2.5 as measured by parallel plate rheometer at 0.1 rad/sec, 180° C., and 10 percent strain.

In one embodiment, the VLDPE component suitable for use in the present invention has an extensional viscosity, as determined on compression molded samples using an ARES rheometer with an EVF extensional attachment at 190° C. and 1.0 sec$^{-1}$ strain rate of equal to or greater than 200,000 Pa-s, more preferably equal to or greater than 300,000 Pa-s, and most preferably equal to or greater than 400,000 Pa-s as determined at a Hencky Strain of 2.5 cm/cm.

The propylene polymer component (b) of the elastomer composition of the present invention comprises at least one branched propylene homopolymer or at least one branched propylene interpolymer. Other suitable propylene-based polymers include branched copolymers of propylene with at least one α-olefin; or a blend of a branched homopolymer and/or a branched copolymer; and/or a nucleated homopolymer, a nucleated copolymer or a nucleated blend of a branched homopolymer and a branched copolymer.

The propylene polymer component may be a mixture of branched polypropylene and unbranched polypropylene wherein the branched polypropylene is present in an amount of at least 10 weight percent based on the weight of the propylene polymer component, preferably at least 20 percent, more preferably at least 30 percent, more preferably at least 40 percent, more preferably at least 50 percent, more preferably at least 60 percent, more preferably at least 70 percent, more preferably at least 80 percent, and most preferably at least 90 percent by weight based on the weight of the propylene polymer component.

The branched polypropylene polymer component of this invention can also comprise a polypropylene impact copolymer, which has been branched and/or rheology modified via azide coupling, to provide a branched and/or coupled polypropylene impact copolymer. Polypropylene impact copolymers can be prepared as described in WO 01/58970, incorporated herein in its entirety by reference. The '970 reference describes reactor produced propylene impact copolymers containing a propylene homopolymer or copolymer and a propylene copolymer containing 20 percent to 70 percent by weight ethylene, butene, hexane and/or octene comonomer.

Suitable branched polypropylenes also include branched and/or coupled polypropylene formed by radiation, such as e-beam or gamma radiation, with or without the presence of a co-agent. Such branching reactions are typically done under an inert atmosphere.

Other suitable polypropylene polymers include coupled polymers, as described in U.S. Pat. No. 6,552,129, incorporated herein in its entirety by reference. As described in U.S. Pat. No. 6,552,129, a poly(sulfonyl azide) coupled polymer is formed by the following steps: (a) forming a first admixture of a first polymer and a poly(sulfonyl azide); (b) then forming a second admixture of the first admixture with a second amount of at least one second polymer; and (c) heating the second admixture at least to the decomposition temperature of the coupling agent for a time sufficient to result in coupling of polymer chains. Additional propylene polymers may be formed from the reaction product or blend product at least one ethylene-based elastomer, a coupling amount of at least one poly(sulfonyl azide) and a propylene-based polymer.

As here used, "branched polypropylene," "branched propylene homopolymer," "branched copolymer of propylene and one or more $\alpha$-olefins," or similar term, means a polypropylene containing one or more H-type or T-type branching, a good discussion of H-type and T-type branching can be found in US Publication No. 2007/0167575, incorporated herein its entirety. Briefly, T-type branching is typically obtained by copolymerization of ethylene or other $\alpha$-olefins with chain end unsaturated macromonomers in the presence of a constrained geometry catalyst (metallocene-type or single site catalyst) under the appropriate reactor conditions, such as those described in WO 00/26268 (US equivalent U.S. Pat. No. 6,680,361, incorporated herein in its entirety by reference). H-type branching is typically obtained by copolymerization of ethylene or other $\alpha$-olefins with a diene having two double bonds reactive with a nonmetallocene type of catalyst in the polymerization process. As the name implies, the diene attaches one polymer molecule to another polymer molecule through a diene bridge, the resulting polymer molecule resembling an H that might be described as more of a crosslink than a long chain branch. H-type branching is typically used when extremely high levels of branching are desired. When H-type branching agents are used, the catalysts used are typically not metallocene catalysts. The catalysts used to prepare the H-type branched polymers in U.S. Pat. No. 6,372,847 (incorporated herein in its entirety by reference) are vanadium type catalysts. Lai et al. describe T-type long chain branching (LCB) polymers in U.S. Pat. No. 5,272,236 in which the degree of LCB is from 0.01 LCB/1000 carbon atoms to 3 LCB/1000 carbon atoms and the catalyst is a constrained geometry catalyst (metallocene-type or single site catalyst).

Isotactic polypropylene homopolymers or copolymers having LCB are exemplary of T-type branched polypropylenes. Branched polypropylenes having H-type branching can be produced using reactive extrusion, as described in U.S. Pat. Nos. 6,472,473 and 6,841,620, or irradiation as described in U.S. Pat. No. 5,514,761. Each of these three patents is incorporated herein, in its entirety, by reference.

Suitable branched polypropylenes also include polymers containing polyethylene branches incorporated into the polypropylene backbone, as described in U.S. Pat. No. 6,750,307, incorporated herein by reference. Here a branched olefin copolymer having an isotactic polypropylene backbone contains polyethylene branches, and, optionally, one or more comonomers. Typically, the total comonomer content of the branched olefin copolymer is from 0 to 20 mole percent. Also, the mass ratio of the isotactic polypropylene to the polyethylene typically ranges from 99.9:0.1 to 50:50. Such branched propylene copolymers may be prepared, as described in U.S. Pat. No. 6,750,307, by the following steps: a) copolymerizing ethylene, optionally with one or more copolymerizable monomers, in a polymerization reaction under conditions sufficient to form copolymer having greater than 40% chain end-group unsaturation; b) copolymerizing the product of a) with propylene and, optionally, one or more copolymerizable monomers, in a polymerization reactor under suitable polypropylene polymerization conditions using a chiral, stereorigid transition metal catalyst capable of producing isotactic polypropylene; and c) recovering a branched olefin copolymer.

The $\alpha$-olefin in the branched propylene copolymer is preferably ethylene, 1-butene, 1-pentene, 1-hexene, 1-heptene, 1-octene, or 4-methyl-1-pentene, with ethylene being more preferred. The $\alpha$-olefin in the propylene copolymer is preferably ethylene. The copolymer may be a random copolymer or a block copolymer or a blend of a random copolymer and a block copolymer.

The propylene component of the polymer blend desirably has a MFR (230° C./2.16 kg weight) from 0.1 to 150 g/10 min, preferably from 0.3 to 60 g/10 min, more preferably from 0.4 to 40 g/10 min, even more preferably from 0.5 to 25 g/10 min, more preferably from 1 to 20 g/10 min, and most preferably from 2 to 15 g/10 min. All individual values and subranges from 0.1 to 150 g/10 min are included herein and disclosed herein. This component also desirably has a melting point greater than 145° C. In another embodiment, the propylene component has a melting point (Tm) from 130° C. to 180° C., preferably from 140° C. to 170° C.

In another embodiment, the branched polypropylene has a MFR (230° C./2.16 kg weight) from 0.1 to 150 g/10 min, preferably from 0.2 to 40 g/10 min, more preferably from 0.5 to 30 g/10 min, and most preferably from 0.5 to 2 g/10 min. All individual values and subranges from 0.1 to 150 g/10 min are included herein and disclosed herein. This component also desirably has a melting point greater than 145° C.

The at least one branched propylene polymer has a melt tan delta equal to or less than 2, preferably equal to or less than 1.75, and more preferably equal to or less than 1.5, as measured by parallel plate rheometer at 0.1 rad/sec, 180° C., and 10 percent strain. Preferably, the ratio of the melt tan delta of the VLDPE to the melt tan delta of the polypropylene component is from 0.1 to 4, preferably from 0.5 to 2.

As here used, "nucleated" refers to a polymer that has been modified by addition of a nucleating agent such as MILLAD™, a dibenzyl sorbitol commercially available from Milliken. Other conventional nucleating agents may also be used.

Preparation of the Branched Polypropylene can Involve the Use of Ziegler Catalysts such as a titanium trichloride in combination with aluminum diethylmonochloride, as described by Cecchin, U.S. Pat. No. 4,177,160, incorporated herein in its entirety by reference. Polymerization processes, used to produce such high melting polymers, include the slurry process, which is run at about 50° C. to 90° C. and 0.5 MPa to 1.5 MPa (5 atmosphere (atm) to 15 atm), and both the gas-phase and liquid-monomer processes in which extra care must be given to the removal of amorphous polymer. An α-olefin copolymer may be added to the reaction to form a block copolymer. The polypropylene may also be prepared by using any of a variety of metallocene, single site and constrained geometry catalysts together with their associated processes.

Suitable branched polypropylene include PROFAX™ branched polypropylenes available from Basell, DAPLOY™ from Borealis and INSPIRE™ from The Dow Chemical Company.

The elastomer composition of the present invention has at least a two-phase morphology, with one phase being the VLDPE component and another phase being the propylene polymer component. Surprisingly, we found that to achieve the optimal blend of thermal, mechanical, and rheological properties with the most improved lowered gloss the VLDPE phase is preferably the continuous phase and the propylene polymer phase is preferably a discontinuous phase wherein the propylene polymer exists as discrete, non-interacting domains in the continuous VLDPE phase. Other components in the elastomer composition of the present invention (additional polymers, additives, and the like) may be dispersed in the VLDPE phase, the propylene polymer phase, or may comprise one or more separate (and in the case of more than one) phase(s) which may be continuous, co-continuous, or discontinuous.

Preferably, the VLDPE component is present in the elastomer composition in an amount equal to or greater than 65 weight percent and preferably equal to or greater than 70 weight percent based on the total combined weight of the VLDPE component and the propylene polymer component.

Preferably, the VLDPE component is present in the elastomer composition in an amount equal to or less than 80 weight percent and preferably equal to or less than 75 weight percent based on the total combined weight of the VLDPE component and the propylene polymer component.

Preferably, the propylene polymer component is present in the elastomer composition in an amount equal to or greater than 20 weight percent, preferably equal to or greater than 25 weight percent based on the total combined weight of the VLDPE component and the propylene polymer component.

Preferably, the propylene polymer component is present in the elastomer composition in an amount equal to or less than 35 weight percent, preferably equal to or less than 30 weight percent based on the total combined weight of the VLDPE component and the propylene polymer component.

In one embodiment of the present invention, the viscosity ratio of the elastomer composition or VLDPE viscosity:propylene polymer viscosity as determined by capillary rheometry at a temperature of 200° C. and a shear rate of 120 $sec^{-1}$ is equal to or less than 0.3, preferably equal to or less than 0.25, more preferably equal to or less than 0.2, and most preferably equal to or less than 0.15. Capillary rheometry is determined according to ASTM D3835.

In a preferred embodiment of the present invention, the VLDPE phase is continuous and the propylene polymer phase is non-continuous and is dispersed in the VLDPE phase as discrete domains.

In addition to the VLDPE and polypropylene polymer, the compositions of the invention advantageously may further comprise at least one additive of the type conventionally added to polymers or polymer compositions. These additives include, for example, process oils; antioxidants, a preferred hindered phenolic antioxidant is IRGANOX™ 1076 antioxidant (available from Ciba-Geigy Corporation); surface tension modifiers; UV stabilizers; scratch/mar additives, such as polydimethyl siloxane (PDMS) or functionalized polydimethyl siloxane or scratch mar formulations containing erucamide; anti-block agents; dispersants; blowing agents; linear or substantially linear ethylene polymers; LDPE; LLDPE; lubricants; crosslinking agents such as peroxides; antimicrobial agents such as organometallics, isothiazolones, organosulfurs and mercaptans; antioxidants such as phenolics, secondary amines, phosphites and thioesters; antistatic agents such as quaternary ammonium compounds, amines, and ethoxylated, propoxylated or glycerol compounds; fillers and reinforcing agents, such as wollastonite, carbon black, glass, metal carbonates such as calcium carbonate, metal sulfates such as calcium sulfate, talc, clay, mica or graphite fibers.

Additional additives include hydrolytic stabilizers; lubricants such as fatty acids, fatty alcohols, esters, fatty amides, metallic stearates, paraffinic and microcrystalline waxes, silicones and orthophosphoric acid esters; mold release agents, such as fine-particle or powdered solids, soaps, waxes, silicones, polyglycols and complex esters such as trimethylolpropane tristearate or pentaerythritol tetrastearate; pigments, dyes and colorants; plasticizers such as esters of dibasic acids (or their anhydrides) with monohydric alcohols such as o-phthalates, adipates and benzoates; heat stabilizers such as organotin mercaptides, an octyl ester of thioglycolic acid and a barium or cadmium carboxylate; ultraviolet light stabilizers used as a hindered amine, an o-hydroxy-phenylbenzotriazole, a 2-hydroxy, 4-alkoxyenzophenone, a salicylate, a cynoacrylate, a nickel chelate and a benzylidene malonate and oxalanilide; and zeolites, molecular sieves, anti-stat agents and other known deodorizers.

Skilled artisans can readily select any suitable combination of additives and additive amounts, as well as the method of incorporating the additive(s) into the composition, without undue experimentation. Typically, each of the above additives, if used, does not exceed 45 weight percent, based on total composition weight, and are advantageously from about 0.001 to about 20 weight percent, preferably from 0.01 to 15 weight percent and more preferably from 0.1 to 10 weight percent.

The elastomer compositions of this invention can be fabricated into parts, sheets or other article of manufacture, using any conventional extrusion, blow molding, foaming, or thermoforming process. Specific examples of such processes include sheet extrusion, profile extrusion, blow molding, and thermoforming, especially vacuum thermoforming. Such processes can produce articles or products having smooth or embossed surfaces.

The elastomer compositions of the invention can be prepared by combining the elastomer component and the propylene component, and preferably combining one or more VLDPE with one or more branched polypropylenes. While such compositions can be prepared by any one of a number of different processes, generally these processes fall into one of two categories, that is, post-reactor blending and in-reactor blending. Illustrative of the former are melt extruders into which two or more solid polymers are fed and physically mixed into a substantially homogeneous composition, and multiple solution, slurry or gas phase reactors, arranged in a parallel array, and in which, the output from each is blended with one another to form a substantially homogeneous composition, which is ultimately recovered in solid form. Illustrative of the latter are multiple reactors connected in series, and single reactors charged with two or more catalysts.

Compounding, or melt blending, may take place in the extruder, calenderer, blow molding machine, foaming equipment, or other kind of forming equipment that melt mixes and makes the fabricated article, this is sometimes referred to as in-line compounding. Alternatively, the elastomeric polymer composition of the present invention may be melt blended by conventional extrusion, in which a compound (generally in the form of a pellet) with or without additives, is obtained. The resulting compound (or pellet) is then extruded into a sheet, profile, blow molded article, injection molded article, or thermoform. Additives may be added to the compounding process neat, in other word in their standard state (i.e., as liquid and/or powders), as concentrates, and/or master batches.

The compositions also may be blended with another polymer, prior to fabrication of an article. Such blending may occur by any of a variety of conventional techniques, one of which is dry blending of pellets of the propylene polymer compositions of this invention with pellets of another polymer.

The propylene polymer compositions of the present invention may also be used in an extrusion blow molding process to form extrusion blow molded articles.

In a preferred embodiment, the elastomer composition of the present invention is used in a process to make a composite article comprising a shaped article and a shaped skin comprising the elastomer composition of the present invention. Processes to make composite shaped articles are well known in the art, for examples see U.S. Pat. Nos. 5,948,867; 6,372,847; 6,407,172; 6,500,900; and US Publications 2003/0197302; 2005/0176892; and 2008/0193684, all of which are incorporated herein in their entirety.

One method of manufacturing such a composite article is to first extrude a sheet, optionally an embossed sheet (i.e., a sheet with a textured or "grained" appearance, wherein the texturing may be done in the same (on-line) or different (off-line) step as making the sheet). The sheet preferably has a thickness equal to or greater than 0.2 mm, more preferably equal to or greater than 0.3 mm, and even more preferably equal to or greater than 0.5 mm. The sheet preferably has a thickness equal to or less than 2.0 mm, more preferably equal to or less than 1.5 mm, and even more preferably equal to or less than 1 mm. The sheet is then shaped by thermoforming, positively thermoforming (sometimes referred to as "male" thermoforming) or preferably negatively thermoforming (sometimes referred to as "female" thermoforming), to the shape of the shaped article. Thermoforming is preferably performed at a temperature equal to or less than 200° C., more preferably equal to or less than 190° C., more preferably equal to or less than 180° C., and most preferably equal to or less than 170° C. Thermoforming is preferably performed at a temperature equal to or greater than 130° C., more preferably equal to or greater than 140° C., and more preferably equal to or greater than 150° C. A preferred target temperature for thermoforming a sheet comprising the elastomer composition of the present invention is 160° C.

Melt tan delta is a useful parameter to determine how well suited a particular thermoplastic composition is for thermoforming. Melt tan delta is the ratio of the viscous modulus divided by the elastic modulus (G"/G') as measured on a dynamic mechanical spectrometer in the melt state. If the value is high the sample flows easily and has little melt strength. If the value is low the sample has a lot of elastic memory or stored energy and little ability to flow. Preferably, a thermoplastic composition has enough melt strength to avoid too much sag in the thermoforming oven yet still have some ability to flow as the part is pulled by vacuum around the tool. Materials can have too much melt strength as well as too little. Typically, a suitable melt strength for thermoforming is found when the melt tan delta, for a specific thermoplastic composition at appropriate thermoforming temperature range, is between 1 and 2.

The shaped skin is then applied to or laminated and/or bonded to the shaped article by conventional methods well known in the art, for example applying adhesives, using fasteners, hand wrapped, foamed-in-place, reverse-foaming, back-injection molded, low-pressure molding, and the like. Optionally, there may be a layer of foam (such as a polyolefin or a polyurethane foamed product) between the shaped foam skin and the shaped article. Further, the surface not bonded to the shaped article may be top-coated or painted for ultra violet (UV) resistance, and/or scratch and mar resistance. Suitable top-coatings and/or paints comprise polyurethanes, saturated polyesters (such as polyethylene terephthalates, PETs or polybutylene terephthalates, PBTs), polyacrylates (such as polymethyl acrylate, polyisobutyl acrylate, poly-2-ethylhexyl acrylate, polymethyl methacrylate, and the like), polyvinyl chlorides, and polyisocyanates (such as polyhexamethylene diisocyanate, polyisophorone diisocyanate, and the like).

The shaped article can be manufactured from known materials, preferably thermoplastics such as polyolefins (POs) such as polyethylene (PE), polypropylene (PP), and the like, thermoplastic polyolefins (TPOs), polycarbonates (PCs), acrylonitrile-butadiene-styrene terpolymers (ABSs), are blends thereof, such as PC/ABS. The shaped article can be made by known methods, for example injection molding, blow molding, structural foam molding, thermoforming, cold-forming, etc.

In another embodiment, the elastomer composition of the present invention is used in a process to make a composite article comprising a shaped article with a shaped skin comprising the elastomer composition of the present invention by first laminating or bonding a sheet (skin), with or without texture, to a foam forming a composite multilayer sheet which is then shaped, preferably by thermoforming, into the shape of the final composite article. The composite article made by this process may be top-coated or painted for UV resistance, and/or scratch and mar resistance. Top-coating and/or painting may be done prior to or after shaping.

In another embodiment, the elastomer composition of the present invention is extruded into sheet and optionally thermoformed for use as non-carpet automotive flooring. The sheet and/or thermoformed flooring is applied to interior vehicle floors. Any thickness that meets the required flooring requirements is acceptable; preferably, the sheet is at least 3 mm in thickness, more preferably 2 mm in thickness.

A partial, far from exhaustive, listing of articles that can be fabricated from the compositions of the invention includes automobile body parts, such as instrument panels, instrument panel skins, instrument panel foam, bumper fascia, body side moldings, interior pillars, exterior trim, steering wheel covers, interior trim, weather stripping, air dams, air ducts, door panels, door panel skins, consoles, arm rests, glove box doors, headliners, air bag cover, flooring, and wheel covers, recreational vehicle parts, golf cart parts, utility cart parts, and water craft parts.

EXAMPLES

Examples 1 and 2 and Comparative Examples A to D are elastomer compositions melt blended on a Killion 1.25 inch (in) sheet extruder using a Barrier Screw with a Maddock Mixer and extruded into sheet. All components are tumble blended for 20 minutes prior to being fed into the extruder. Sheet is extruded measuring about 1 mm thick and 10 in wide onto a Davis Standard three roll stack having chrome polished steel rolls. The extruder barrel temperatures, from the hopper to the die, are 195° C., 200° C., 210° C., 215° C., and 215° C. with a melt temperature of 240° C. and the roll stack temperatures from top to bottom are 32° C., 32° C., and 23° C.

The composition for Examples 1 and 2 and Comparative Examples A to D are given in Table 1 below in parts by weight based on the total weight of the composition. Unless otherwise noted, molecular weights are absolute molecular weight determined by laser low angle light scattering (LALLS). In Table 1:

VLDPE: is a very low density polyethylene produced via gas phase polymerization using a Ziegler Nada catalysis, it is an ethylene-butene copolymer characterized by a MFR (190° C./2.16 kg) of 0.1 g/10 min, a density of 0.884 g/cc, a viscosity, as determined by capillary rheometry at 200° C. and 120 sec$^{-1}$ of 2415 Pa-s, a rheology ratio of 30, and a Shore D hardness of 29: and a weight average molecular weight of 250,000 grams per mole (g/mol) with a z average molecular weight of 920,000 g/mol;

SLEP: is a substantially linear ethylene polymer comprising long chain branching manufactured using a metallocene catalysis, it is an ethylene-butene copolymer characterized by a MFR (190° C./2.16 kg) of 0.5 g/10 min, a density of 0.870 g/cc, a viscosity, as determined by capillary rheometry at 200° C. and 120 sec$^{-1}$ of 3985 Pa-s, a rheology ratio of 16, a Shore D hardness of 22, and weight average molecular weight of 160,000 g/mol with a z average molecular weight of 295,000 g/mol.

"PP-1" is a branched propylene-ethylene copolymer having 8.5 percent ethylene, with a MFR (230° C./2.16 kg) of 0.5 g/10 min, a density of 0.903 g/cc, and a viscosity, as determined by capillary rheometry at 200° C. and 120 sec$^{-1}$ of 1400 Pa-s, and a weight average molecular weight of 430,000 g/mol;

"PP-2" is a medium impact propylene-ethylene copolymer having 9 percent ethylene, with a MFR (230° C./2.16 kg) of 35 g/10 min, a density of 0.9 g/cc, and a viscosity, as determined by capillary rheometry at 200° C. and 120 sec$^{-1}$ of 255 Pa-s, and a weight average molecular weight of 174,000 g/mol;

"Black" is a black color concentrate comprising carbon black in polypropylene available from PolyOne designed to meet GM 167A;

The above components are prepared for melt tan delta measurement by compression molding, as received pellets, in a "25 mm diameter" by "2 mm thick" mold. The compression molding machine is a hydraulic Carver press. The compression molding conditions are 9090 kg force, 190° C., for four minutes, followed by cooling at 9090 kg force, 15° C., for four minutes. A "1/1 blend" ratio of PP-1 and PP-2 (used in Example 2/Comparative Example B) is prepared by melt mixing the ingredients in a 30 mm Werner Pfleiderer twin screw extruder at 250 revolutions per minute (RPM), barrel temperatures 140 to 220° C. The blend composition is compression molded. The separate polymer components and the blend composition are tested for melt tan delta using a Rheometric Scientific ARES model oscillating parallel plate rheometer at 180° C., a frequency of 0.1 rad/sec, and a 10 percent strain.

Rheology ratio (RR) is the ratio of the polymer viscosity determined at 0.1 rad/sec divided by the polymer viscosity determined at 100 rad/sec and is a measurement of the slope of the viscosity curve, in other words, it tracks shear sensitivity of a polymer. Rheology ratios reported hereinabove are determined using a Rheometric Scientific ARES model oscillating parallel plate rheometer at 180° C. and a 10 percent strain.

The following characterizations and tests are performed on Examples 1 and 2 and Comparative Examples A to D:

"Morphology" is the analysis of morphology on samples that are sectioned such that images reflect morphology looking down the direction of flow at the core of the sheet. Morphology describes the multi-phase structure of the blend, for example co-continuous (two phases are fully interconnected) and discrete (the minor phase is dispersed as particles). Samples are prepared using cryo-milling at −150° C. and cryo-microtoming at −120° C. Tapping Mode AFM (TMAFM) is obtained on a Digital Instruments D3100 using a Nanoscope IV controller (software version 5.30 rsr3). Phase images in trace and retrace are captured and collected. Scan sizes of 20×20 um, 10×10 um & 5×5 um (depending on sample) are imaged from 4 random locations for each sample;

"VR" is viscosity ratio based on apparent viscosity as measured by capillary rheology and is determined according to ASTM D3835. It is the polypropylene component viscosity:VLDPE viscosity wherein the 1:1 PP-1:PP-2 viscosity used for the VR in Example 2 and Comparative Example B is determined from the 1:1 blend described hereinabove;

"MTD" melt tan delta ratio is the melt tan delta ratio of the elastomer component to the melt tan delta of the propylene component wherein melt tan delta is measured by parallel plate rheometer at 0.1 rad/sec, 180° C., and 10 percent strain. The melt tan deltas for the elastomer components and propylene components are summarized in Table 2;

"Shore A" and "Shore D" hardness are determined according to ASTM D2240;

"60° Gardner Gloss" is determined according to ASTM D523, values reported in percent;

"TMA" is thermal mechanical analysis performed on a TA instrument, testing across a temperature range of 25° C. to 150° C. ramping at 5° C./min. TMA is a probe penetration test and is run at a force of 1000 meter Newton (mN). Temperatures are recorded when the probe penetrated to 1000 microns. Samples are cut from 1 mm thick sheet and stacked three deep to generate a sufficient depth to test to 1000 microns; and "Tensile Strength" is determined according to ASTM D412, values are determined in both the machine and cross direction.

TABLE 1

| Example | | 1 | | 2 | | |
|---|---|---|---|---|---|---|
| Comparative Example | A | | B | | C | D |
| Composition | | | | | | |
| SLEP | 68.6 | | 68.6 | | 68.6 | |
| VLDPE | | 68.6 | | 68.6 | | 68.6 |
| PP-1 | 29.4 | 29.4 | 14.7 | 14.7 | | |
| PP-2 | | | 14.7 | 14.7 | 29.4 | 29.4 |
| Black | 2 | 2 | 2 | 2 | 2 | 2 |

TABLE 1-continued

| Example | A | 1 | B | 2 | C | D |
|---|---|---|---|---|---|---|
| Comparative Example | | | | | | |
| Morphology | Co-continuous | Co-continuous | Discrete | Discrete | Discrete | Discrete |
| Properties | | | | | | |
| VR | 0.35 | 0.58 | 0.13 | 0.21 | 0.06 | 0.11 |
| MTD | 1.14 | 1.02 | 0.65 | 0.58 | 0.09 | 0.08 |
| Shore A | 95 | 93 | 87 | 90 | 88 | 85 |
| Shore D | 42 | 42 | 34 | 38 | 36 | 34 |
| 60° Gardner Gloss, % | 40 | 8 | 23 | 3 | 9 | 2 |
| TMA, ° C. | 116 | 152 | 110 | 132 | 90 | 114 |
| Tensile Strength, MPa | | | | | | |
| machine direction | 15 | 19 | 14 | 18 | 14 | 16 |
| cross direction | 21 | 15 | 14 | 14 | 14 | 8 |

TABLE 2

| Component | Melt Tan Delta |
|---|---|
| SLEP | 1.83 |
| VLDPE | 1.63 |
| PP-1 | 1.60 |
| PP-2 | 20.01 |
| 50:50 mix of PP-1:PP-2 | 2.8 |

What is claimed is:

1. An elastomer composition consisting essentially of a very low density ethylene polymer component and a propylene polymer component, said composition having at least two phases, a very low density ethylene polymer phase and a propylene polymer phase wherein
   a) the very low density ethylene polymer component has a density equal to or less than 0.89 g/cc and is present in an amount of from 65 to 80 parts by weight and
   b) the propylene polymer component comprises at least one branched polypropylene and is present in an amount of from 20 to 35 parts by weight,
wherein the very low density ethylene polymer phase is continuous, the melt tan delta ratio between the very low density ethylene polymer component and the propylene polymer component is from 0.5 to 4 as measured by parallel plate rheometer at 0.1 radians per second, 180° C., and 10 percent strain, and parts by weight are based on the total combined weight of the very low density ethylene polymer and propylene polymer components.

2. The composition of claim 1 wherein the at least one branched polypropylene is a copolymer of propylene and an α-olefin, selected form ethylene, 1-butene, 1-pentene, 1-hexene, 1-heptene, or 1-octene.

3. The composition of claim 1 wherein the propylene polymer component is a mixture of branched polypropylene and unbranched polypropylene.

4. The composition of claim 3 wherein the branched polypropylene is present in at least 50 weight percent based on the weight of the propylene polymer component.

5. A process to make an automotive composite article comprising a shaped article and a shaped skin comprising the steps of:
   i forming a sheet comprising an elastomer composition consisting essentially of a very low density ethylene polymer component and a propylene polymer component, said composition having at least two phases, a very low density ethylene polymer phase and a propylene polymer phase wherein
      a) the very low density ethylene polymer component has a density equal to or less than 0.89 g/cc and is present in an amount of from 65 to 80 parts by weight and
      b) the propylene polymer component comprises at least one branched polypropylene and is present in an amount of from 20 to 35 parts by weight,
   wherein the very low density ethylene polymer phase is continuous, the melt tan delta ratio between the very low density ethylene polymer component and the propylene polymer component is from 0.5 to 4 as measured by parallel plate rheometer at 0.1 radians per second, 180° C., and 10 percent strain, and parts by weight are based on the total combined weight of the very low density ethylene polymer and propylene polymer components;
   ii shaping the sheet into a shaped skin; and
   iii applying the shaped skin onto the shaped article producing an automotive composite article.

6. The process of claim 5 wherein the automotive composite article is an instrument panel, an interior trim, a door panel, a console, an arm rest, a glove box door, a headliner, an air bag cover, a steering wheel cover, a recreational vehicle part, a golf cart part, a utility cart part, and a water craft part.

7. A process to make automotive non-carpet flooring comprising the steps of:
   i forming a sheet comprising an elastomer composition consisting essentially of a very low density ethylene polymer component and a propylene polymer component, said composition having at least two phases, a very low density ethylene polymer phase and a propylene polymer phase wherein
      a) the very low density ethylene polymer component has a density equal to or less than 0.89 g/cc and is present in an amount of from 65 to 80 parts by weight and
      b) the propylene polymer component comprises at least one branched polypropylene and is present in an amount of from 20 to 35 parts by weight,
   wherein the very low density ethylene polymer phase is continuous, the melt tan delta ratio between the very low density ethylene polymer component and the propylene polymer component is from 0.5 to 4 as measured by parallel plate rheometer at 0.1 radians per second, 180° C., and 10 percent strain, and parts by weight are based on the total combined weight of the very low density ethylene polymer and propylene polymer components;
   ii shaping the sheet into an automotive flooring; and
   iii applying the shaped automotive flooring to an interior vehicle floor.

8. The composition of claim 1 in the form of an article.

* * * * *